Nov. 21, 1961 A. W. QUICK ET AL 3,009,323
DRIVING SYSTEMS FOR MACHINE TOOLS
Filed March 7, 1957 3 Sheets-Sheet 1

INVENTORS
August Wilhelm Quick
Hans Lindemann

United States Patent Office  3,009,323
Patented Nov. 21, 1961

3,009,323
DRIVING SYSTEMS FOR MACHINE TOOLS
August Wilhelm Quick, Aachen, and Hans Lindemann, Bielefeld, Germany, assignors to Th. Calow & Co. Maschinenfabrik u. Eisengiesserei, Bielefeld, Germany, a firm
Filed Mar. 7, 1957, Ser. No. 644,516
Claims priority, application Germany Mar. 28, 1956
8 Claims. (Cl. 60—54)

The present invention relates to new improvements in a drive for machine tools, and particularly in prime movers for driving cutting-machine tools at a certain desired constant speed by means of infinitely variable speed-control means.

Prior to this invention, such machines were usually driven by adjustable prime movers such as electrical Ward-Leonard drives, tube-controlled direct-current drives, infinitely variable polyphase induction motors and the like, or by prime movers with a substantially uniform speed followed by an infinitely variable gear of a mechanical or hydraulic type. The first-mentioned electric prime movers have proved successful but their purchase price is very high. Although the mechanical and hydraulic gears for varying the driving speed are less expensive than the mentioned electrical machines if used for a higher output, they have the disadvantage of a considerably shorter life than the latter. The application of the known prime movers is especially difficult if the prime mover is required to furnish a substantially constant output speed, and if an adequate protection against an overload is also to be provided.

Thus, if a bar or the like of a certain diameter is to be peeled or skimmed, the speed of rotation as adjusted should change as little as possible during the finishing operation and this should also be true even though the feed and thus the cutting output might be changed. If a rod or the like of another diameter is to be finished, the speed of rotation must then also be changed. However, the respective speed should remain constant during the operation and the full output of the machine should be available.

It is an object of the present invention to provide an inexpensive infinitely variable drive for machine tools and machines of other types which possesses all the advantages of a Ward-Leonard drive but avoids all the disadvantages thereof.

In order to protect the prime mover itself, as well as the means for driving the same, sufficiently from breakdowns and overloads, it might be possible to provide the driven shaft of a variable gear which is driven by the prime mover or the driven shaft of an electrically controlled drive with suitable coupling means which are adapted to limit the torque adjustably, for example, a Foettinger-type flow clutch or a magnetic clutch or the like, and the other side of which is connected to the respective machine tool. However, a drive of such a type would still further increase the cost thereof. The driving means of the known types wherein the speed thereof is dependent upon the respective load, such as torque converters, turbines, electric series-wound motors, internal combustion engines, steam engines, or the like, are considerably less expensive in purchase price than the driving means previously mentioned, but do not by themselves permit the rotary speed to be maintained as constantly as required.

It is another object of the present invention to select from the last-mentioned group such driving means, the speed of rotation of which decreases when a certain load is being exceeded, for example, torque converters or turbines, and to provide means for automatically controlling the operation of such driving means so that a certain desired rate of speed will be maintained at least substantially, regardless of the load to which the respective machine may be subjected. This, in other words, means that the characteristic of these driving means will be adjusted so as to correspond to the characteristic of the expensive prime movers previously mentioned.

In order to attain this object of maintaining a constant speed, it is necessary to provide control means, and if it were possible to provide control means which respond and operate instantaneously, the ideal conditions for attaining a synchronous movement of the drive would be fulfilled. However, there is no control means which is able to act instantaneously, that is, without any time delay. In a case where the respective machine tool or the like is subject to very high accelerations and decelerations, it would be advisable to provide a control by means of an acceleration-responsive device.

Further objects, features, and advantages of the present invention will be apparent from the following detailed description thereof, particularly when read with reference to the accompanying drawings, in which.

Figure 1:
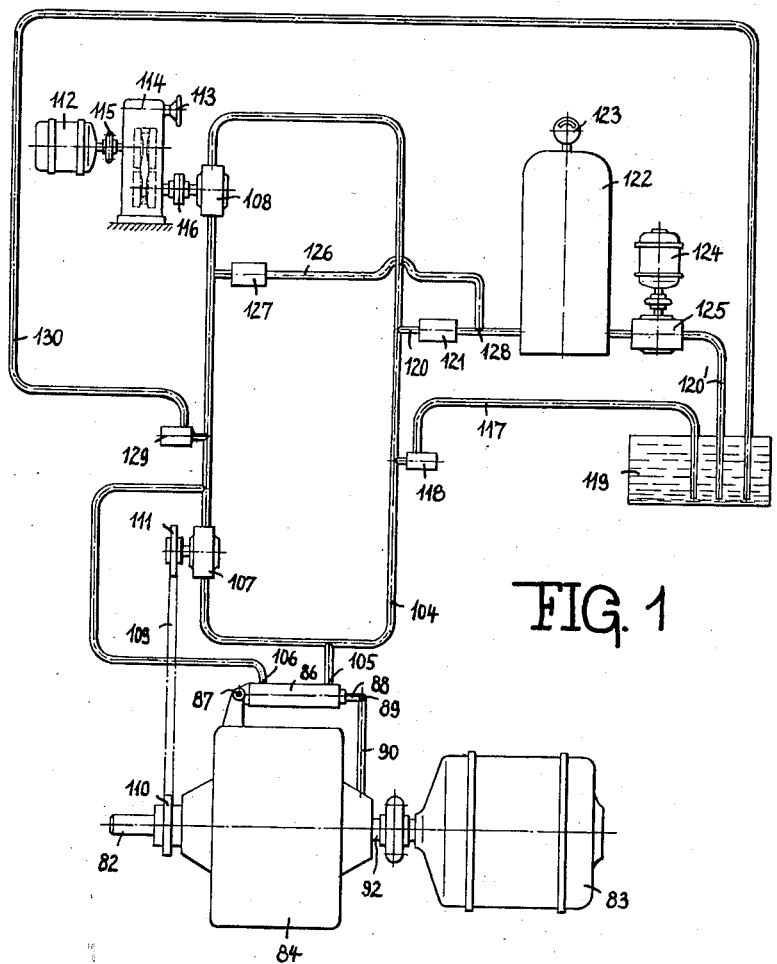
FIG. 1 shows an embodiment of a driving system according to the invention for operating a machine tool and provided with a torque converter which is driven by a prime mover.
Figure 2:
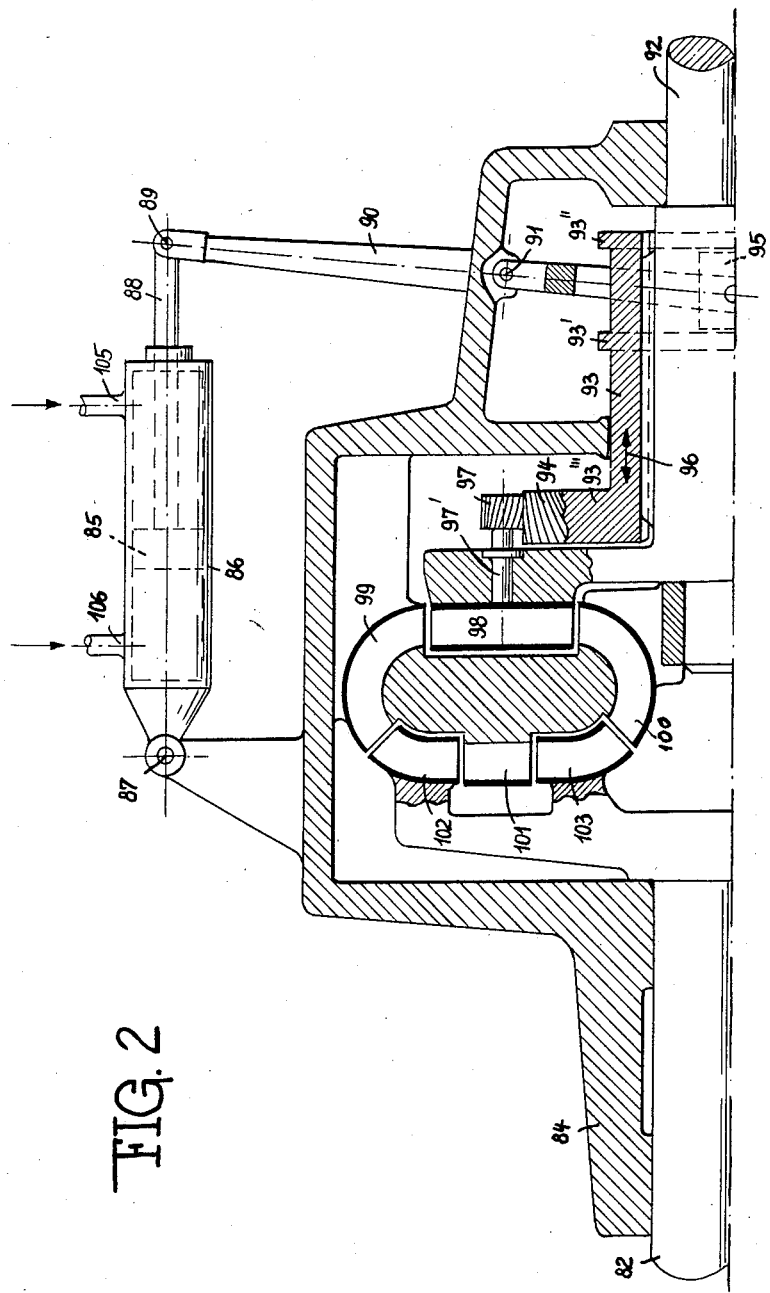
FIG. 2 shows a partial cross section through the torque converter illustrated in FIGS. 1 and 3.

Referring now to FIGS. 1 and 2, a machine to be driven by this unit is coupled directly to the driven shaft 82 of a torque converter 84 which, in turn, is driven by prime mover, shown to be an electric motor 83. Torque converter 84 is adjustable, for example, by a control element including a control piston 85 which is slidable within a cylinder 86 which is pivotally mounted at 87 on torque converter 84. Piston rod 88 of piston 85 is pivotally connected at 89 to a two-armed lever 90 which, in turn, is pivotally mounted at 91, for example, within the housing of torque converter 84. Drive shaft 92 of torque converter 84 carries a sleeve bushing 93 with a pair of flanges 93' and 93" at the outer end and a flange 93''' at the inner end, which latter forms a helical gear 94. The lower arm of the two-armed lever 90 is of bifurcated shape and carries slide members 95 at its lower end which engage between flanges 93' and 93" so that, when lever 90 is pivoted about its pivot 91, sleeve bushing 93 will be shifted in the direction as shown by arrow 96. The helical gear 94 is adapted to engage with helical pinions 97 which are secured to shafts 97' so that the rotatable pump blades 98 of the impeller wheel which is secured to shaft 97' may be adjusted when bushing 93 is shifted. The stationary guide vanes of torque converter 84 are identified by numerals 99, 100, and 101. Guide vanes 99 and 100 are separated in the usual manner from vane 101 by the turbine, blades 102 and 103, respectively, of the output means of the torque converter which is secured to the driven shaft 82.

Piston cylinder 86 is connected at 105 to a control conduit 104, in which oil is circulated under pressure so as to act upon piston 85. Two pumps 107 and 108 are interposed within control conduit means 104. Pump 107 may be driven, for example, through a chain drive 109 to 111 by the driven shaft 82 of torque converter 84, while in the embodiment as shown in FIG. 1 pump 108 is driven by an electric motor 112 through an infinitely variable gear 114, which is adjustable by a handwheel 113, and through couplings 115 and 116.

A pipe line 117 branches off from control conduit 104 and leads first to a safety valve 118 in the form of a pressure relief valve and then to an oil container 119. Another pipe-line 120 branches off from pipe-line 104 in front of the second pump 108 and leads first to a one-way valve 121 and then to a pressure tank 122 in which the circulating oil is stored under air pressure which may be read on a pressure gauge 123. The other side of pressure tank 122 is connected to an oil feed pump 125 which is driven by a motor 124 and is likewise connected by a pipe-line 120' to oil container 119. Between pumps 107 and 108, another pipe-line 126 branches off from pipe 104 and is first connected to another one-way valve 127 and then at 128 to pipe 120. A further pressure-relief valve 129 is connected, on the one hand, to pipe-line 104 between pumps 107 and 108 and, on the other hand, to a pipe-line 130 which leads to oil container 119.

The output of pump 108 according to the embodiment shown in FIG. 1 is adjustable as this pump is driven by the infinitely variable gear 114.

If pump 108 has, for example, twice the output of pump 107 when running at the same speed as the latter, pump 108 may be driven more slowly than pump 107. This may be of importance if the infinitely variable gear 114 should be driven at relatively low speeds in order to protect it from excessive wear.

The operation of the driving system according to the embodiment shown in FIG. 1 is as follows:

At first, motor 112 will be switched on. This may be a normal asynchronous motor or, in special cases, a synchronous motor. By means of the infinitely variable gear 114, pump 108 will then be brought up to the proper speed at which the driven shaft 82 should subsequently rotate. Pump 108 then conveys the fluid in the direction toward pump 107. Since this pump 107 is standing still, an excess pressure will be produced in the branch of line 104 between the two pumps, which passes through line 106 to cylinder 86 and forces piston 85 therein toward the right, thereby turning the blades of torque converter 84 to increase the torque thereof. Safety valve 129 prevents the pressure in line 104' from exceeding a certain adjustable value.

Since pump 108 produces a suction in the branch of line 104 behind this pump, new fluid will be continuously supplied thereto from pressure tank 122 through one-way valve 121. Pump 125 maintains the pressure in tank 122 at a certain desired and adjustable limit, and also supplies an adequate amount of fluid to the tank from container 119. Therefore, when the main motor 83 is switched on, torque converter 84 will run at the greatest possible torque and accelerate the driven shaft 82 until the speed responsive pump 107 is being driven through the chain drive 109 to 111 to run at a speed slightly higher than the adjusted speed of pump 108, so that pump 107 conveys a larger amount of fluid than pump 108. Consequently, the pressure at inlet 105 of control cylinder 86 will become higher than at inlet 106 with the result that control piston 85 returns toward the left to produce a smaller torque of torque converter 84. Depending upon the torque which has to be supplied by the driven shaft 82, piston 85 will thereafter be automatically adjusted so as to maintain shaft 82 at a substantially constant speed regardless of the load which might be exerted upon shaft 82 by the respective machine to be driven. Relief valves 118 and 129 prevent the pressure in lines 104 and 104' from exceeding a certain maximum, while one-way valves 121 and 127 provide at all times the required amount of fluid in these lines and prevent air locks from forming within the circuit. If during the operation of the driving system, the machine tool or the like is to be driven at a different speed, it is merely necessary to adjust the infinitely variable gear 114, for example, by means of handwheel 113, so as to change the speed of pump 108. The driven shaft 82 will then very quickly adapt itself to such different speed.

If the efficiency of the driving system and the degree of independence of the hydraulic system upon the speed of rotation of the driven shaft 82 is to be further increased, an infinitely variable gear may be interposed between the driven shaft 82 of torque converter 84 and the shaft of the speed-responsive pump 107, and an acceleration-responsive device is mounted on the shaft of pump 107, the two electric circuits of which are connected to a pole-changeable motor which is directly coupled to the second fluid pump 108' to drive the same. This modification differs from the embodiment according to FIG. 1 only by a different location of the infinitely variable gear at another place, by the provision of an acceleration-responsive device on the shaft of the pump which is driven by the infinitely variable gear, and by the provision of a pole-changeable reversible motor which drives the second pump directly.

Figures 3, 4:
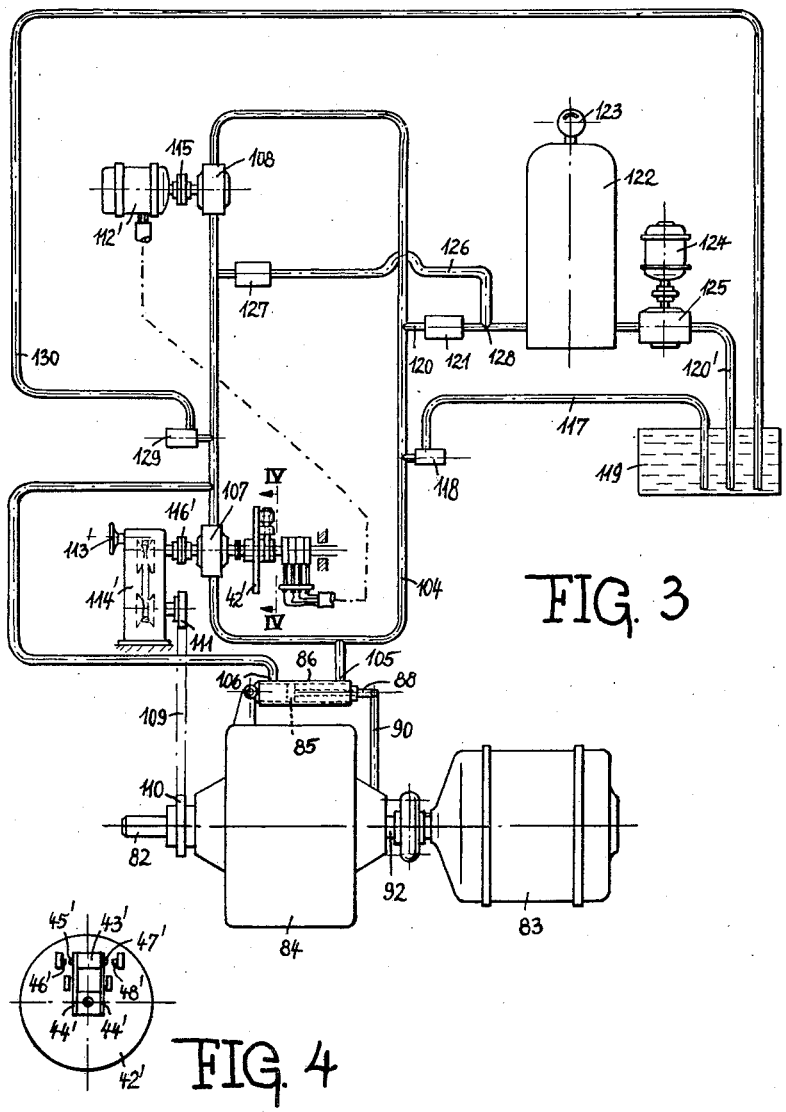
FIG. 3 shows a preferred embodiment of the invention.
FIG. 4 shows a cross section taken along line IV—IV of FIG. 3.

This embodiment of the invention is illustrated in FIGS. 3 and 4, in which those parts which are similar to the corresponding parts in the embodiment according to FIG. 1 are given the same reference numerals.

While pump 107 is shown in FIG. 1 as being driven directly by the driven shaft 82 of torque converter 84 through the chain drive 109 to 111, pump 107 of the embodiment according to FIG. 3 is driven indirectly by means of a chain drive 109 to 111, an infinitely variable gear 114' and a coupling 116'. Similarly as in FIG. 1, gear 114' may be adjustable, for example, by means of a handwheel 113'. Pump 108 is driven directly by a pole-changeable motor 112' through a coupling 115'. Pump 107 and 108 constitute a speed-responsive device.

The shaft of the first pump 107 carries an acceleration-responsive device shown in FIG. 4. This instrument consists of a disk 42' and a weight 43' which is pivotally mounted on leaf springs 44' relative to disk 42'. If weight 43', which tends to rotate at constant speed, lags behind the accelerated disk 42', or moves faster than the decelerated disk 42, either contacts 45' and 46' or contacts 47' and 48' will engage each other whereby one or the other circuit of motor 112' will be closed and the voltage of motor 112' will be either increased, or reversed, resulting in an increased output of pumps 108, or in stopping of pump 108.

The two pumps 107 and 108 will thereby always be made to rotate at substantially the same rate of speed, for example, at 1000 r.p.m., regardless of the speed of the driven shaft 82, which will further improve the efficiency of the driving sytem. In the operation of the respective machine, sudden jolts might occur, as easily happens, for example, in bar turning machines, such as peeling and skimming machines, so that the speed of rotation would then quickly decrease and thereafter again increase to the normal rate. Since the shaft of the speed-responsive pump 107 is provided with an acceleration-responsive device 42' to 48' and the pole-changeable motor 112 is controlled by the two motor circuits, any jolts occurring in the operation of the machine will be taken up and compensated very quickly. Assuming for instance that motor 112' normally runs at 1000 r.p.m., it may be either connected to run at 1,500 r.p.m. to compensate for deceleration or connected to a reverse current to compensate for acceleration. If motor 112' is connected to a reverse current, the rotor will have to change its direction of rotation. However, such change will not occur since motor 112' is directly coupled to pump 108. Consequently, motor 112' will come to a stop. If the motor is connected to run at 1500 r.p.m., it will suddenly increase its output considerably. If the acceleration-responsive device responds to a deceleration, the speed of motor 112' will suddenly increase from 1000 r.p.m. to 1500 r.p.m. without any other change in the system. As soon as such deceleration has been compensated, motor 112' and thus also pump 108 will return to its normal rotation of 1000 r.p.m. If a rapid acceleration should occur, for example, if the load upon the driven machine tool is suddenly relieved, the current will be reversed so that pump 108 will stop and piston 85 will change its position to compensate for such acceleration. As soon as the acceleration has been compensated, pump 108 will again run at its normal speed, that is, in the present case at 1000 r.p.m., and no additional control operation will be required since the system will always adjust itself automatically.

Although the driving units according to the present invention are principally intended for machine tools, it is to be understood that they may also be used for driving other machinery, for example, rolling mills, marine engines and ships, and the like, which have to run at a constant speed.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. Drive system for a machine tool, comprising, in combination, prime mover means; a turbine type drive including fluid impelling input means connected to and driven by said prime mover means, turbine means having a rotary output means adapted to be connected to a driven element subjected to a variable load in a machine tool, and adjusting means for adjusting the output torque of said output means; and control means including a first rotary pump driven from said output means, a second rotary pump, a reversible motor for driving said second rotary pump, a conduit means connecting said first and second rotary pumps, a control element including a cylinder and a control piston movable in said cylinder and connected to said adjustable means, a first control conduit means connecting the inlet of said first pump and the outlet of said second pump with one end of said cylinder, a second control conduit means connecting the outlet of said first pump and the inlet of said second pump with the other end of said cylinder so that said first and second rotary pumps constitute a speed-responsive device controlling said control piston, an acceleration-deceleration responsive device driven from said output means and including a pair of contact means closed upon acceleration or deceleration of said output means, respectively, circuit means connecting said contact means with said motor of said second rotary pump for increasing and reducing, respectively, the output of said second pump in accordance with the acceleration and deceleration of said output means so that said control piston is correspondingly actuated whereby the output torque of said output means is adjusted to maintain said driven element at constant speed regardless of load variations.

2. A drive system as set forth in claim 1 and including an infinitely variable transmission means intermediate said output means and said first rotary pump for adjusting the speed of said first rotary pump.

3. A drive system as set forth in claim 1 wherein said acceleration-deceleration responsive device is connected to said first rotary pump to be rotated by the same.

4. A drive system as set forth in claim 1 wherein said acceleration-deceleration responsive device includes a rotary disc, weight means spaced from the axis of said disc, and spring means secured to said disc and to said weight means and tending to hold said weight in a normal position, each of said contact means including a contact secured to said weight means and a contact secured to said disc, said contacts on said weight means being located intermediate and spaced from said contacts on said disc in said normal position of said weight means, and respectively engaging the associated contact on said disc when said weight means is displaced against the action of said spring means during acceleration or deceleration of said output means.

5. A drive system as set forth in claim 1 wherein said turbine means is a torque converter, wherein said input means is an impeller wheel having adjustable vanes, and wherein said adjusting means adjust the angular position of said vanes and thereby the output torque of said rotary output means of said torque converter.

6. A drive system as set forth in claim 1 and including an additional pump means having output conduits connected to said conduit means at points intermediate said first and second pumps, a container for an operating liquid connected to the inlet of said additional pump means, and a pair of additional conduit means connecting points of said conduit means intermediate said first and second pumps with said container, and one-way valve means in said output conduits and in said additional conduit means.

7. Drive system for a machine tool, comprising, in combination prime mover means; a turbine type drive including fluid impelling input means connected to and driven by said prime mover means, turbine means having a rotary output means adapted to be connected to a driven element subjected to a variable load in a machine tool, and adjusting means for adjusting the output torque of said output means; and control means including a first rotary pump driven from said output means, a second rotary pump having a variable and adjustable output, a conduit means connecting said first and second rotary pumps, a control element including a cylinder and a control piston movable in said cylinder and connected to said adjustable means, a first control conduit means connecting the inlet of said first pump and the outlet of said second pump with one end of said cylinder, a second control conduit means connecting the outlet of said first pump and the inlet of said second pump with the other end of said cylinder so that said first and second rotary pumps constitute a speed-responsive device controlling said control piston, an acceleration-deceleration responsive device driven from said output having a variable and adjustable output means and being connected to said second pump for adjusting the output of the same for increasing and reducing, respectively, the output of said second pump in accordance with the acceleration and deceleration of said output means so that said control piston is correspondingly actuated whereby the output torque of said output means is adjusted to maintain said driven element at constant speed regardless of load variations.

8. Drive system for a machine tool, comprising, in combination, prime mover means; a turbine type drive including fluid impelling input means connected to and driven by said prime mover means, turbine means having a rotary output means adapted to be connected to a driven element subjected to a variable load in a machine tool, and adjusting means for adjusting the output torque of said output means; and control means including a first rotary pump driven from said output means, a second rotary pump, a motor for driving said second rotary pump, a conduit means connecting said first and second rotary pumps, a control element including a cylinder and a control piston movable in said cylinder and connected to said adjustable means, a first control conduit means connecting the inlet of said first pump and the outlet of said second pump with one end of said cylinder, a second control conduit means connecting the outlet of said first pump and the inlet of said second pump with the other end of said cylinder so that said first and second rotary pumps constitute a speed-responsive device controlling said control piston, an acceleration-deceleration responsive device driven from said output means and being connected to said motor of said second pump and controlling the same for adjusting the output of said second pump for increasing and reducing, respectively, the output of said second pump in accordance with the acceleration and deceleration of said output means so that said control piston is correspondingly actuated whereby the output torque of said output means is adjusted to maintain said driven element at constant speed regardless of load variations.

References Cited in the file of this patent

UNITED STATES PATENTS

| | | |
|---|---|---|
| 2,291,011 | Vickers | July 28, 1942 |
| 2,636,594 | Kerr | Apr. 28, 1953 |
| 2,768,636 | Postel et al. | Oct. 30, 1956 |
| 2,805,549 | Hensleigh et al. | Sept. 10, 1957 |